United States Patent [19]

Hanchett

[11] Patent Number: 5,576,901
[45] Date of Patent: Nov. 19, 1996

[54] DC MOTOR ACTUATOR FOR LIGHT MODIFICATION

[76] Inventor: Neville Hanchett, 6569 Cleomore Ave., West Hills, Calif. 91307

[21] Appl. No.: 455,013

[22] Filed: May 31, 1995

[51] Int. Cl.$^6$ .................................................. G02B 7/182
[52] U.S. Cl. .......................... 359/877; 359/856; 359/857; 362/811
[58] Field of Search .................................... 362/233, 284, 362/811; 359/877, 856, 857, 858

[56] References Cited

U.S. PATENT DOCUMENTS

| | | | |
|---|---|---|---|
| 4,428,649 | 1/1984 | Main et al. | 359/877 |
| 5,097,362 | 3/1992 | Lynas | 359/877 |
| 5,315,442 | 5/1994 | Sato et al. | 359/877 |
| 5,339,192 | 8/1994 | Cho | 359/877 |
| 5,477,390 | 12/1995 | Boddy et al. | 359/877 |

*Primary Examiner*—Timothy P. Callahan
*Assistant Examiner*—Jung Ho Kim
*Attorney, Agent, or Firm*—Wagner & Middlebrook

[57] ABSTRACT

A light system includes a laser light generator and an array of motor-driven mirrors aligned to deflect a beam of laser light in various directions to create a light show. The motors are operated in a controlled sequence by a motor controller. The motors are small d.c. permanent magnet motors which are driven from a d.c. source whose voltage is adjustable to vary the frequency of oscillation of the motors and, hence the mirrors. Connected to each motor is a small coil spring whose coil is carried on the motor shaft and which has two extended arms, one of which is secured to a nearly stationary member and one which is secured to the mirror shaft. The mirror shaft is movable between two stops. The spring acts to oppose the direction of motion of the motor such that the motor is normally stalled out and driven back to one of the stops before it can be moved for enough to impact the other stop.

18 Claims, 2 Drawing Sheets

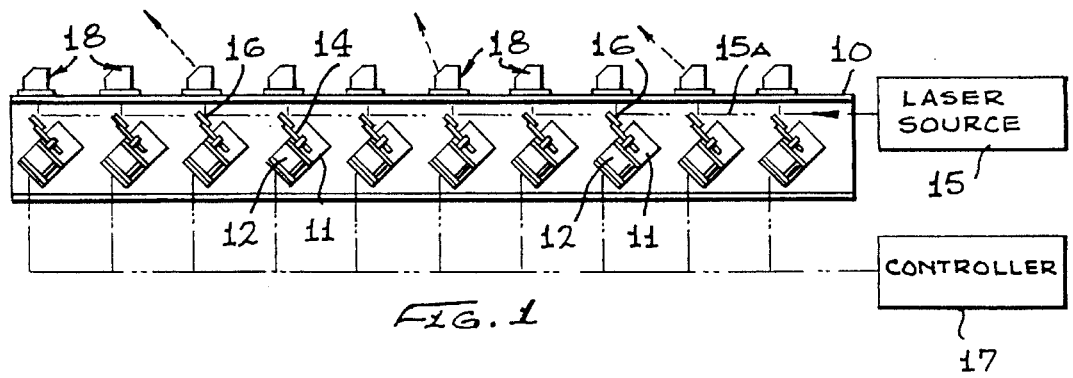
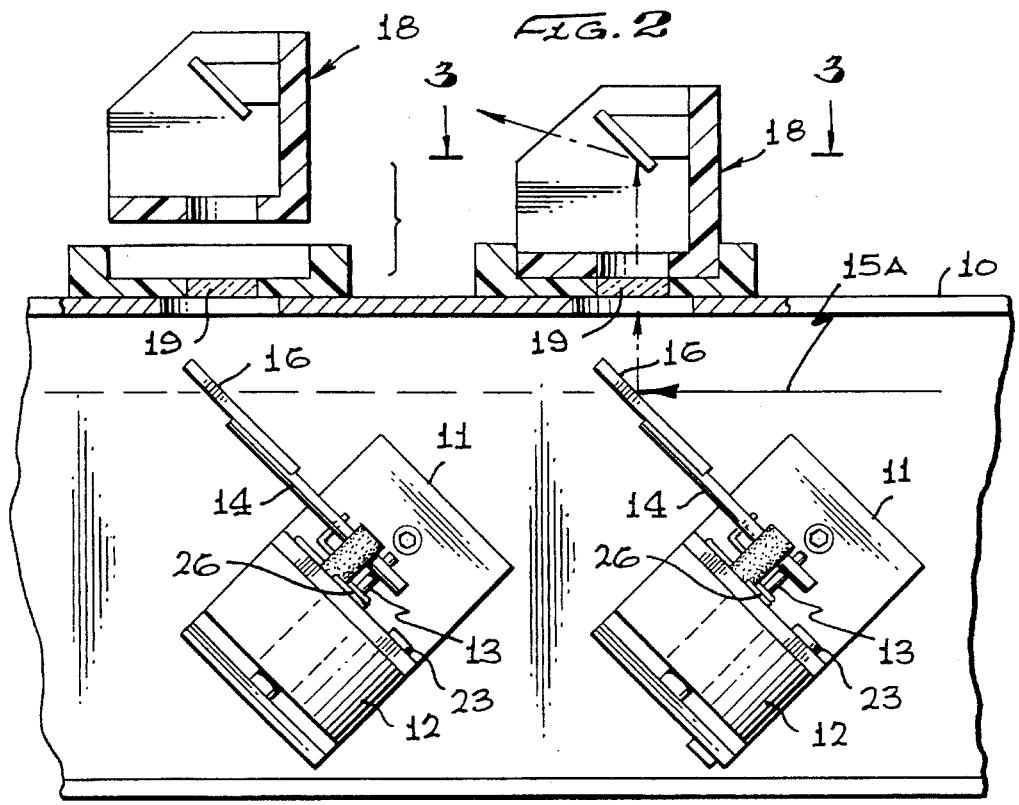
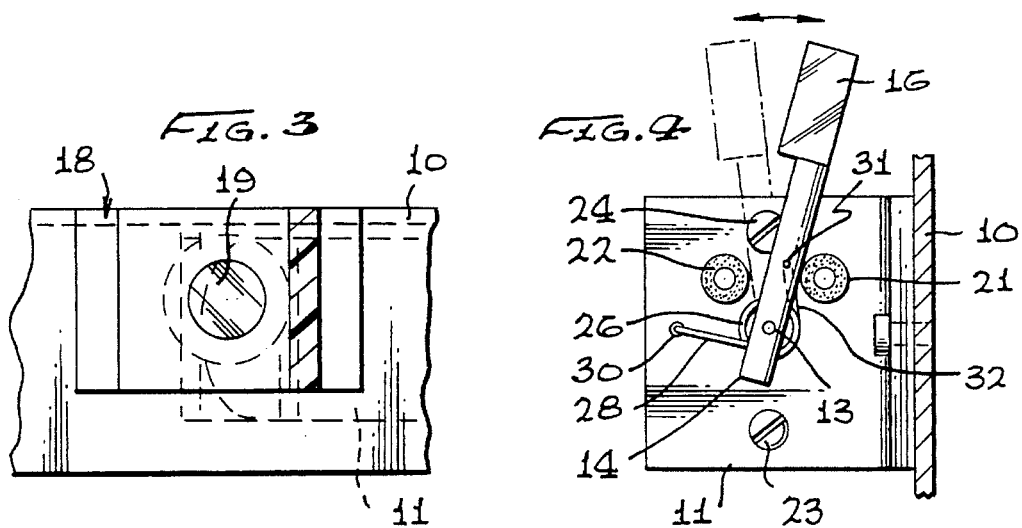

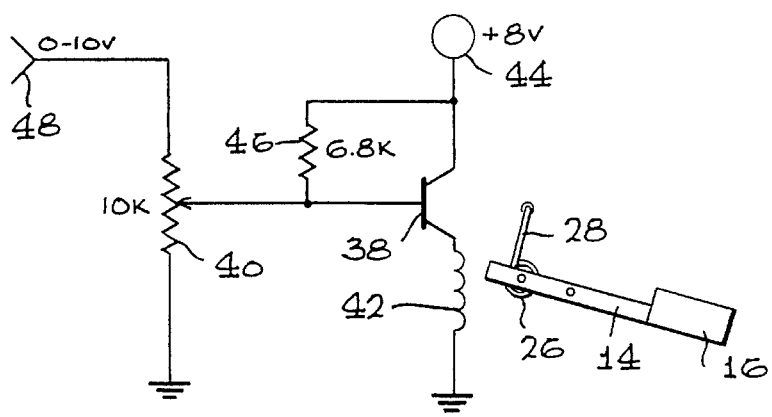
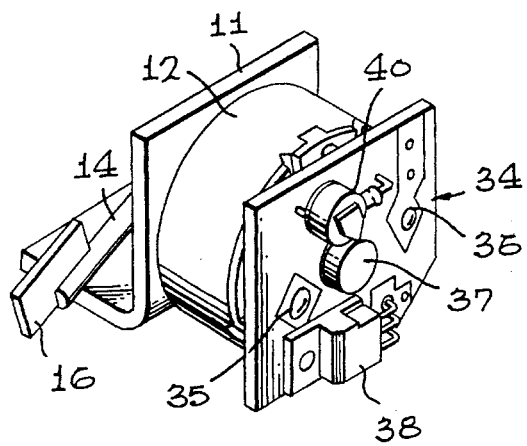
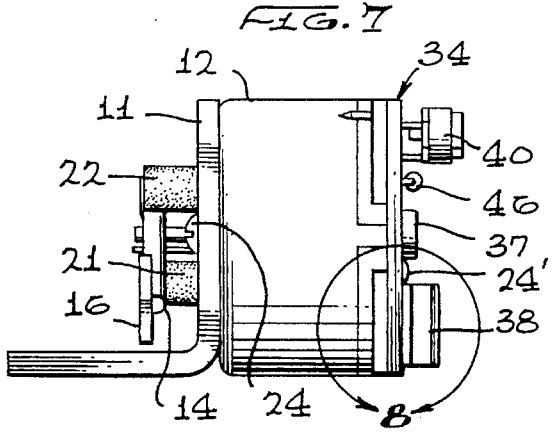
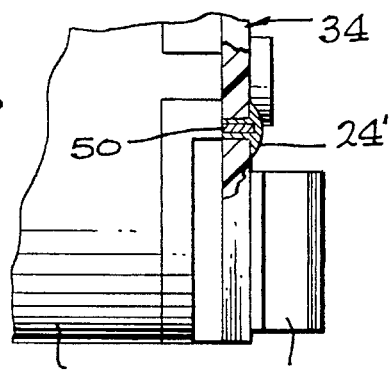
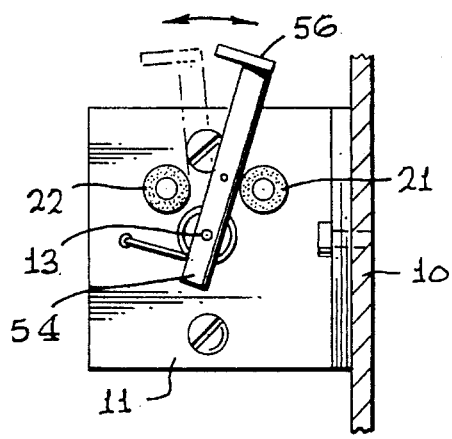
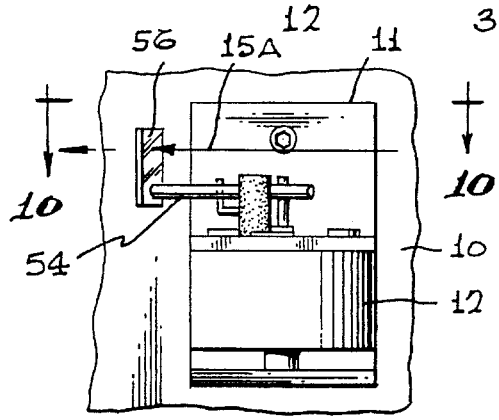

DC MOTOR ACTUATOR FOR LIGHT MODIFICATION

BACKGROUND OF THE INVENTION

There is a significant demand for systems using laser beams to create light shows for night clubs and the like. One type of system used for this purpose consists of a laser generating device in combination with a plurality of motor actuated mirrors which are carefully aligned with each other and with the laser beam and timed to deflect the laser beam as separate spots or beams of light which are deflected in many directions. Each mirror is fastened to a shaft which is attached to the motor output shaft. To achieve the desired light effect, the mirror support must be exactly perpendicular to the motor output shaft. The desired deflection of the mirror requires only a limited rotation of the motor and the mirror support operates between two spaced stops. Such light show systems have been in use for a number of years but have represented a fairly significant investment. They also have been somewhat heavy and cumbersome so that, while they can be moved from place to place, moving them requires a substantial effort.

One of the reasons for the size and also the expense of the currently used light show system is that the galvanometer type electric motors which are used are individually fairly heavy and expensive so that a bank of, for example, ten such motors installed in a frame which is suitably strong and heavy to establish and maintain the required alignment, represents a very substantial weight and a cost of the order of several thousand dollars. It would be very desirable to improve the portability and reduce the cost of such light systems.

BRIEF DESCRIPTION OF THE INVENTION

Since the size, weight and cost of the presently used systems are all largely affected by the use of the galvanometer-type motors used, it seemed to the applicant that investigating alternatives to the motors used was desirable.

In considering the possible use of available motors, cost constraints were very significant. Although simple permanent magnet direct current motors such as those used for tape drives are available at very low cost, it initially appeared that such motors could not be employed without a chopped power supply which in itself would add to the expense and complication of the system. Such motors operate at comparatively low voltage levels (10 volts or less) and at current levels of approximately 250 milliamperes.

Applicant has discovered that by attaching a spring to the mirror support with the opposite end secured to a nearby stationary member, the input current can be set to a value where it drives the motor against the spring force to a position where the spring force, which increases with displacement, overcomes the driving current, thus driving the motor and the mirror support back to the original position.

The motor then is, in effect, stalled out against the spring. Stops are included to limit the motor shaft rotation to a specific angle, but the stop close to the rotation limit is essentially for the purpose of avoiding possible overshooting and is not intended as a normal limit on motor rotation. The spring normally drives the mirror support back to its opposite stop which is only slightly displaced from its at rest or unenergerized position. By setting the current as desired, the frequency of oscillation may be varied. While the drive circuit, discussed below, can drive the mirror support up to about 20 Hz, a normal setting would cause the mirror support to oscillate at a frequency of about 7 Hz.

The motor is secured to a moderately heavy support member which serves as a heat sink as well as a means for mounting the motor to the frame. At the opposite end of the motor, a printed circuit board is soldered to motor contacts. This board also has significant mass and serves to a degree as a heat sink. While it might be thought that a d.c. motor of the type described would overheat if driven as described, the input current is limited and little or no heating of the motors is perceptible even after several hours of continuous use.

Various types of light modifying arrangements may be installed on the mirror supports. While applicant's principal use is to drive reflecting mirrors; color filters, half mirrors and diffraction filters are examples of devices which can be moved into the path of a laser beam to produce desired effects.

BRIEF DESCRIPTION OF THE DRAWING

This invention may be more clearly understood with the following detailed description and by reference to the drawings in which:

FIG. 1 is a front elevation an array of the mirror actuator assemblies with a laser light source and controller according to the invention;

FIG. 2 is an enlarged fragmentary view of the frame and motor actuator assemblies of FIG. 1;

FIG. 3 is a sectional view taken along line 3—3 of FIG. 2;

FIG. 4 is a front elevational view of one of the mirror actuator assemblies according to the invention;

FIG. 5 is a rear perspective view of the motor actuator assembly of FIG. 4;

FIG. 6 is a schematic drawing of the drive circuit for driving the motor of FIGS. 4 and 5;

FIG. 7 is a right side elevational view of the motor actuator assembly of FIGS. 4 and 5;

FIG. 8 is an enlarged fragmentary view, partly in section, of a portion of FIG. 7;

FIG. 9 is a side elevational view of a motor assembly similar to that of FIG. 5 but with a different light modifying device; and FIG. 10 is a sectional view taken along line 10—10 of FIG. 9.

DETAILED DESCRIPTION OF THE INVENTION

Referring now to FIG. 1, an array of mirror actuators is shown fastened to an elongated frame 10 in the form of a channel. The mirror actuators include a plurality of sub frame members 11 and secured to each sub frame member is a small d.c. electric motor 12. Each motor 12 includes a motor shaft 13 to which is attached a mirror support 14. A conventional laser light generator 15 directs a beam of laster light 15A parallel to the paths of a number of small mirrors 16 secured to the outboard ends of the mirror supports 14. Connected to each of the motors 12 is a light controller 17 which is a commercially available unit and which includes switches and controls controlling the sequence and d.c. voltage supplied to the motors 12.

In the absence of a signal to any of motors 12, the laser beam continues through the channel and out the opposite end. When a signal is supplied by the controller 17 to any of motors 12, that motor is energized causing its mirror support or support arm 14 and mirror 16 to deflect the laser beam upwardly through an aperture in the top flange of frame 10 to a deflecting member 18, which further deflects the laser beam in any of several directions as indicated. Normally, several mirrors 16 may be moved into the path of the laser beam at a time. Some mirrors may be 50% clear and 50% mirror and others 100% mirror for example. The controller may operate to provide motor signals at various frequencies, but seven to ten activations per second is typical.

FIG. 2 shows an enlarged portion of elongated frame 10 with two of motors 12 secured to sub-frame members 11 which are bolted to frame 10. Each of the motors 12 is shown with its motor shaft 13, the mirror support 14 and the mirror 16. The frame 10 includes a series of apertures through which the laser beam is deflected toward the deflecting members 18. As shown in this view, the deflecting members 18, each include a window 19 through which the laser beam is transmitted before it strikes a mirror 20 forming part of the deflecting member 18. Mirror 20 may be positioned to deflect the laser beam at a number of desired angles. As indicated in FIG. 2, the upper part of deflecting member 18 may be removed and repositioned to deflect the beam in a different direction, or it may be replaced with a mirror set at a different angle. It also may be replaced with any of various types of filters or other lenses if desired.

Two separate mirror deflecting units are shown in FIG. 2 including sub-frame units 11 to which motors 12 are attached. Each of motors 12 operates to move mirror support 14 to place its mirror 16 either into the laser light beam 15A where it is deflected upwardly through window 19 to deflecting mirror 20, or not into the beam 15A in which case the beam continues along the series of mirror actuators until it strikes one of mirrors 16, or passes through the array as shown in FIG. 1.

FIG. 3 is a sectional view taken along line 3—3 of FIG. 2 showing a fragmentary portion of the top of frame 10, with the aperture therethrough, the deflecting member 18 and the window 19.

FIG. 4 is a front elevational view of one of the motor actuator assemblies of FIG. 1. The motor shaft 13 extends through sub-frame member 11. The mirror support 14 is shown fastened to motor shaft 13 and a mirror 16 is attached at the outer end of mirror support 14.

The mirror support is constrained to move between two stops; one stop 21 being a stop limiting movement toward the right (as shown) in the at rest condition of motor 12 and the other stop 22 serving to limit overshooting when the motor has deflected the mirror by the maximum amount, as indicated in dotted outline. The mirror support 14 usually does not reach stop 22. The motor 12 (FIG. 5) is attached to the sub-frame 11 by means of screws 23 and 24. A coiled spring 26 is positioned around the motor shaft 13 and includes an arm 28 which is hooked through a hole 30 in subframe 10 and a second arm 32 which is hooked to a port 31 in mirror support 14.

The motor 12 (shown in FIG. 5) is driven by a d.c. input from an electrical circuit affixed to a circuit board 34. Board 34 is fastened to the end of the motor opposite the sub-frame 11 by means of solder connections to a pair of motor terminals 35, 36. The end of the motor 12 to which the circuit board 34 is attached is formed of insulating material apart from terminals 35, 36. A portion of this end is a boss 37 which forms an internal support for motor shaft 12 and which extends through a port in printed circuit board 34. Attached to the circuit board 34 are a power transistor 38 and a potentiometer 40, both of which are connected to printed circuit wiring on the opposite side of circuit board 34.

To aid in understanding the operation of motor 22, reference is made to the schematic drawing, FIG. 6. In this drawing, the motor winding is shown at numeral 42 where it is connected in the emitter circuit of the power transistor 38. The collector of transistor 38 is connected to an 8 volt d.c. source as shown at numeral 44 and the base is connected to the slider of potentiometer 40. A bias resistor 46 is connected between the 8 volt d.c. source and the base of transistor 38. Potentiometer 40 is connected between a d.c. source 48 which is variable between 0 and 10 volts, and ground or common. The d.c. current in motor winding 42 drives the motor shaft 12, hence mirror support 14, such as to move mirror support 14 upwardly against the force of coil spring 26. Deflection of the motor shaft 12 varies directly with the current flowing through winding 42; the larger the current, the greater the amount mirror support 14 will move before it is stalled and forced back to stop 21 by spring 26. This current value is established by the setting on potentiometer 40 and does not exceed 250–300 milliamperes. As indicated above, it is not intended that mirror support 14 actually contact stop 22 during normal operation. Stop 22 does, however, limit movement of mirror support 14 to prevent overshooting in the case of transient voltage surges, etc.

FIG. 7 is a right side elevational view of the motor actuator assembly of FIGS. 1 and 2. In this view, it will be seen that sub-frame 11 is "L" shaped in cross section, the laterally extending portion providing a means of attachment to the elongated frame 10. Sub-frame 11 serves also as a heat sink, carrying heat away from motor 12. Visible in this view are mirror support 14, mirror 16, stops 21 and 22, attachment screw 24, motor 12, and circuit board 34. Shown mounted on the circuit board 34 are the power transistor 38, potentiometer 40 and bias resistor 46. A fragmentary view on an enlarged scale, partly in section, is shown in FIG. 8. A portion of circuit board 34 is shown broken away to portray a motor terminal 50 extending through circuit board 34 where it is secured to board 34 by means of solder terminal 24'.

FIG. 9 is a side elevational view of a motor assembly similar to that described above but with a different light modifying device attached somewhat differently to frame 10. All parts which are, or may be, identical to those described above have been given the same numerals. As described above, the actuator includes a sub frame 11 secured to a frame 10 and to which is secured a d.c. permanent magnet motor 12. The output shaft 13 of the motor 12 drives a support arm 54 to which is attached a color filter member 56. Member 56 is attached perpendicularly at the end of support arm 54. As shown, the color filter member 56, is behind the laser light beam 15A when motor 12 is not energized, so beam 15A is not affected. When motor 12 is energized, support arm 54 and color filter 56 are moved in a direction out of the plane of the paper and into the path of laser light beam 15A, thereby modifying the color of beam 15A.

The use of the small d.c. motor operated as described affords a very substantial reduction in the size, weight and cost of the light show apparatus. Typically, ten or more such mirror operators are employed in such systems. The motor described (Mabuchi RF-500TB) is 32 mm in diameter and 35.5 mm long (along its axis from boss 37 to the end of motor shaft 12). It weighs approximately 59 gm (2 oz.). The galvanometer-type motor which it replaces is considerable longer and wider and weighs approximately 255 gm (9 oz).

It will be recognized that with ten such motor-operated mirror actuators mounted in a frame stiff enough to maintain alignment of the mirrors, the reduction from the prior art system in both weight and length of applicant's system is very substantial.

Those skilled in the art will recognize that modifications may be made within the scope of the present invention. Other similar motors may be used and the drive circuit could be modified as desired. For example, the drive circuits could be incorporated in the controller.

The above described embodiments of the present invention are merely descriptive of its principles and are not to be considered limiting. The scope of the present invention instead shall be determined from the scope of the following claims including their equivalents.

What is claimed is:

1. In a light system including an elongated frame, a laser light generator creating a beam of laser light, a plurality of electric motors having motor shafts supported in said frame, a support arm attached to each of said motor shafts, a light modifying device attached to each of said support arms, a controller for providing individual input signals to said electric motors to individually move selected light modifying devices into the path of said beam of laser light, and stops limiting the rotation of said support arms:

characterized in that said electric motors are direct current permanent magnet motors, a subframe is fastened to each of said electric motors, each subframe is fastened to said elongated frame, and springs are secured between each of said support arms and its corresponding subframe urging each of said support arms toward one of said stops against the force of said electric motors.

2. An actuator as claimed in claim 1 wherein each of said springs is a coil spring having coils around one of said motor shafts and each of said springs has a first arm anchored on its corresponding subframe and a second arm anchored on one of said support arms.

3. An actuator as claimed in claim 1 wherein an individual amplifier circuit is connected to drive each electric motor, said amplifier circuit being is located on a printed circuit board, and said printed circuit board is secured to each respective electric motor.

4. An actuator as claimed in claim 3 wherein each of said motors includes a winding, and each of said amplifier circuits includes a power transistor connected to said winding.

5. An actuator as claimed in claim 3 wherein each of said motors includes input terminals and each of said printed circuit boards includes terminals mechanically and electrically fastened to said input terminals.

6. An actuator for a light system including a light modifying device, a support arm attached to said light modifying device, electric motor means for driving said support arm, a pair of stops for limiting the travel of said support arm, and means for securing said electric motor means to said system, characterized in that said electric motor means is a direct current permanent magnet motor, circuit means is connected to said motor for driving said motor in a first direction, and resilient means is positioned between said support arm and said securing means, said resilient means urging said support arm in a second direction against one of said stops.

7. An actuator as claimed in claim 6 wherein said electric motor includes a motor shaft attached to said support arm, and said resilient means is a coil spring having coils around said motor shaft and having a first arm anchored on a fixed part of said system and a second arm anchored on said support arm.

8. An actuator as claimed in claims 8 wherein a transistor amplifier is connected to drive said motor, said amplifier is mounted on a circuit board, and said circuit board is secured to said motor.

9. An actuator as claimed in claim 8 wherein said motor includes a winding, said transistor amplifier includes a power transistor connected in a common emitter configuration, and said winding is connected to the emitter of said transistor.

10. An actuator as claimed in claim 8 wherein said motor includes input terminals and said circuit board includes terminals mechanically and electrically fastened to said input terminals.

11. In a laser system including a light modifying device, a support arm attached to said light modifying device, an actuator including a d.c. electric motor having a winding and an output shaft attached perpendicularly to said support arm, a subframe member to which said motor is attached, a spring attached to said subframe and to said support arm such that the force of said spring acts on said support arm in opposition to the torque of said motor, and an electrical circuit connected to said motor for supplying power to said motor.

12. An electric mirror actuator system as claimed in claim 11 wherein said electrical circuit includes a transistor amplifier connected to said motor in a common emitter configuration and said motor winding is connected between said emitter and a common terminal.

13. An electric mirror actuator as claimed in claim 11 wherein said electrical circuit includes a printed circuit board attached to said motor.

14. An actuator as claimed in claim 11 wherein said spring is a coil spring having coils around said motor shaft and a first arm anchored on said subframe member and a second arm anchored on said support arm.

15. In a light system including an elongated frame, an electric mirror actuator including a permanent magnet direct current electric motor having a motor winding and a motor shaft, a subframe attached to said frame and to said motor, a mirror support arm having one end attached perpendicularly to said motor shaft, a mirror fastened to the opposite end of said mirror support arm, a spring attached at one end to said subframe and at the opposite end to said mirror support arm such that the force of said spring acts in opposition to the torque of said motor, and a circuit board attached to said motor at its end opposite said motor shaft, said circuit board including a transistor amplifier connected to said winding.

16. In a light system including an elongated frame, a source of a beam of laser light, a plurality of electric motors having motor shafts supported on said frame, a mirror and a mirror support arm attached to each of said electric motor shafts and a controller for providing input signals to each of said electric motors to individually move said mirrors to deflect said laser light beam;

a mirror actuator including said motors, wherein each of said electric motors is a permanent magnet d.c. motor;

a plurality of subframes are secured to said elongated frame with each of said electric motors being secured to a corresponding one of said subframes; and springs are attached between each of said subframes and its corresponding support arm such that the forces of said springs act in opposition to the torque of said electric motors.

17. A mirror actuator as claimed in claim 16 wherein each of said springs is a coil spring having coils around one of said motor shafts and a first arm anchored on one of said subframes and a second arm anchored on one of said mirror support arms.

18. A mirror actuator as claimed in claim 16 wherein an amplifier including a transistor connected in a common emitter configuration is connected to each of said motors, each said motor includes a winding and said winding is connected to the emitter of said transistor.

* * * * *